Aug. 11, 1953

W. D. HOUGHTON 2,648,767

FREQUENCY DIVIDER

Filed May 21, 1947

INVENTOR.
WILLIAM D. HOUGHTON

BY *Harry Tunick*

ATTORNEY

Patented Aug. 11, 1953

2,648,767

UNITED STATES PATENT OFFICE 2,648,767

FREQUENCY DIVIDER

William D. Houghton, Port Jefferson, N. Y., assignor to Radio Corporation of America, a corporation of Delaware Application May 21, 1947, Serial No. 749,473

8 Claims. (Cl. 250—27)

This invention relates to electrical counting circuits, frequency dividers and the like, and provides a simple circuit for dividing a given frequency signal by much larger integral factors than circuits now in use.

An object of the present invention is to provide a stable counter or frequency divider circuit which can divide by integral factors up to 100 or more.

Another object is to provide a step wave counter circuit which can provide larger amplitude risers for the same number of steps in the step wave compared to known types of counter circuits, or if the same amplitude range per step is desired to provide a considerably greater number of steps or risers while using the same values of supply voltages as known types of counters.

The circuit of the invention is of the counter type in which a storage condenser receives an incremental charge for each applied pulse. When the voltage across the condenser rises above the cut-off potential of a normally non-conducting tube, the tube circuit oscillates by virtue of a transformer connected between its plate and grid and discharges the condenser. A feature of the invention lies in the circuit arrangement which causes the storage or charge collecting condenser to start with a very large negative value at the end of the discharge, and to rise in value with each pulse or incremental increase in charge toward the zero or ground value but never to reach zero before the condenser is again discharged to a low negative value at the end of the cycle of operations.

Figure 1:
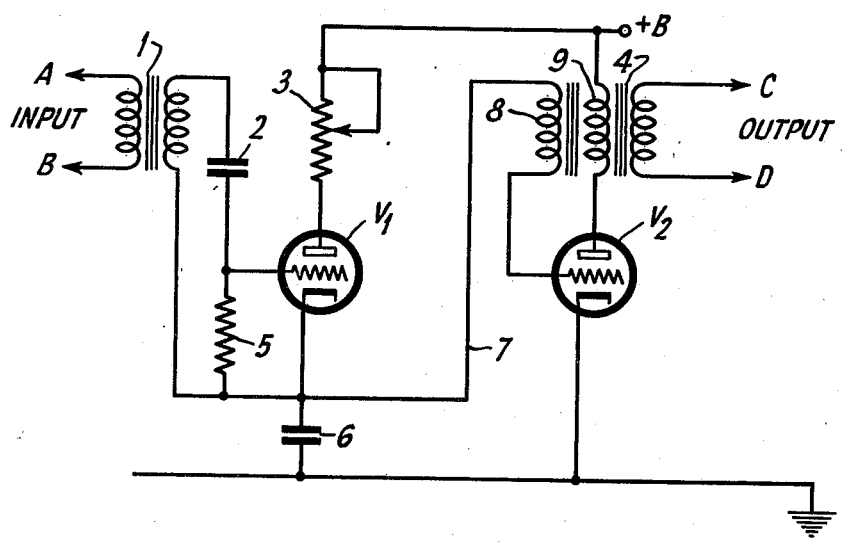
Figure 2:
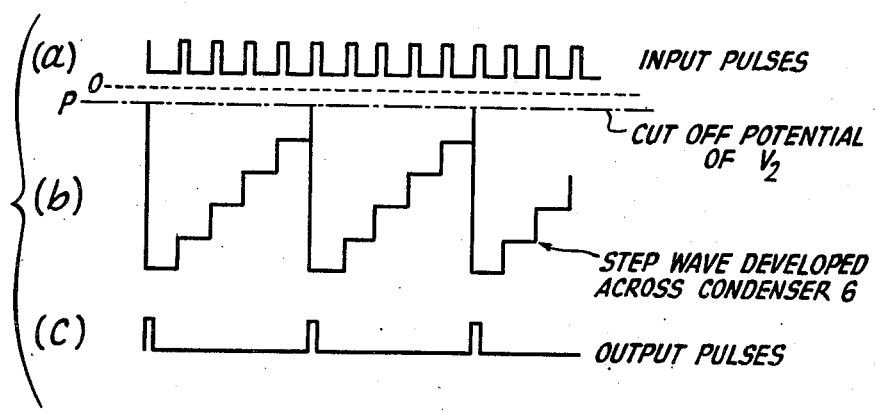

A detailed description of the invention now follows in conjunction with a drawing, wherein:

Fig. 1 illustrates one embodiment of the frequency divider or counter circuit of the invention; and Fig. 2 illustrates a series of curves given in explanation of the operation of the circuit of Fig. 1.

Referring to Fig. 1, there is shown a counter circuit comprising a pair of coupled triode type vacuum tubes V1 and V2 each of which has a cathode, a grid and an anode. Input pulses to be counted or divided are applied to terminals A, B connected to the primary winding of pulse input transformer 1. The secondary winding of input transformer 1 has one end connected through coupling condenser 2 to the grid of vacuum tube V1, while the other end of this secondary winding is connected to the cathode of tube V1. A grid leak resistor 5 is connected between the grid and cathode of tube V1. A storage or charge collecting condenser 6 is connected between the cathode of tube V1 and ground. The anode of tube V1 is connected through a variable resistor 3 to the positive terminal +B of a source of unidirectional anode polarizing potential. The values of grid leak resistor 5 and condenser 2 are such that tube V1 is normally biased below the anode current cut-off condition during the time interval between input pulses.

The cathode of tube V1 is connected through lead 7 and one winding 8 of a three-winding pulse transformer 4 to the grid of tube V2. The middle winding 9 of transformer 4 is connected between +B and the anode of tube V2. The third winding is connected to terminals C, D for abstracting output pulses from the circuit. The cathode of tube V2 is connected directly to ground. In effect, tube V2 is a one-shot oscillator which is normally biased below the anode current cut-off condition and which produces a pulse each time the voltage on its grid rises above its cut-off potential. The windings of transformer 4 are so poled as to effect this result.

In the operation of the circuit of Fig. 1, each time an input pulse of positive polarity is applied across the grid and cathode of tube V1, the grid of this tube will be driven positive and cause tube V1 to conduct, as a result of which an incremental step or rise in voltage will be developed across the storage or charge collecting condenser 6. The voltage built up across condenser 6 will increase in steps in response to correspondingly applied input pulses until such time as the voltage across this condenser exceeds the cut-off potential of tube V2. When this occurs, current starts to flow through winding 9 of transformer 4, and due to the proper feedback connections of transformer 4, the tube V2 starts to oscillate. After one cycle of oscillation, a negative voltage equal approximately to the pulse developed across transformer 4 and appearing on winding 8 is developed across condenser 6 and causes tube V2 to cease conducting and remain cut-off until this voltage is reduced to a value equal to the cut-off potential of V2 by means of incremental reductions in charge each time tube V1 conducts. Stated otherwise, the conduction of tube V2 charges condenser 6 to a large negative value due to grid current flowing in winding 8 of transformer 4.

The curves of Fig. 2 are given in explanation of the operation of the system of Fig. 1. Curve $a$ represents a series of input pulses applied to terminals A, B. In practice, these input pulses need not be rectangular waves inasmuch as any suitable waveform may be used which has a peak amplitude sufficient to cause tube V1 to conduct and develop sufficient bias to render it non-conducting between peak values. The incremental charges appearing on condenser 6 are shown in curve $b$ of Fig. 2 which illustrates the step wave developed across this condenser. The horizontal dash-dot line P of curve $b$ represents the cut-off potential on tube V2, while the horizontal dash line O represents the zero or ground value. Although only five risers have been shown for curve b, it should be understood that this number of risers is merely given for illustration only, since in practice, a considerably larger number of risers may be used, each riser corresponding in time to the appearance of an input pulse. Curve c represents the output pulses which appear at output terminals C, D. It will be seen that the step wave voltage developed across condenser 6 starts with a large negative value and rises with each pulse or incremental increase in charge toward the zero or ground value represented by the dash line O of curve b. The step voltage wave developed across condenser 6 never reaches zero because condenser 6 is discharged when the total charge reaches the cut-off or critical point of tube V2, which is below zero and represented by the horizontal dash-dot line P.

When the discharge of condenser 6 occurs, the firing or conduction condition of tube V2 drives the condenser 6 to its most negative value. Electrons from the grid of tube V2 are stored on condenser 6 when tube V2 conducts. Each time an input pulse is applied to tube V1 to cause this tube to conduct, a portion of this negative stored charge on condenser 6 is removed through tube V1, the magnitude of the charge removed being a function of the duration of the applied input pulse, the value of 6, the anode impedance of tube V1, and the value of resistor 3. Anode resistor 3 is made adjustable in order to provide a means of adjusting the dividing factor when the pulse length and the value of condenser 6 are constant. Of course, the dividing factor may be changed by changing the value of condenser 6 or the input pulse length depending upon the application of the circuit. The adjustment of the anode resistor 3 determines the amount of negative charge removed from the condenser 6 on the occurrence of each positive input pulse which makes tube V1 conduct.

By arranging the windings of transformer 4 properly, so that a step-up is obtained between the anode and grid windings of this transformer, a negative voltage greater than the value of +B may be developed across condenser 6. By means of the arrangement of the circuit of Fig. 1, I am able to obtain a total amplitude of step wave across condenser 6 which is equal to or greater than the value of +B but opposite in polarity thereto, and it is for this reason, among others, that the counter of the present invention is more stable when dividing by large factors than conventional counters using the same anode voltage supply potential, since each time tube V1 conducts condenser 6 is charging up toward +B as a top limit, hence when the negative voltage across condenser 6 is equal to +B the effective charging voltage applied to condenser 6, resistor 3 and vacuum tube V1 is 2 × +B at the start of the cycle and equal approximately to +B at the time tube V2 fires. This feature among others, distinguishes the invention from conventional counters wherein a storage capacitor is charged positively in steps from zero to the conducting point of a biased tube, after which the condenser is discharged at the end of each cycle of counting. In such conventional circuits it is impossible to produce a step voltage wave equal to the supply voltage +B.

Compared to conventional counters wherein the voltage developed across the storage condenser is above zero, the counter of the present invention provides larger amplitude risers for the same number of steps in the step wave, using the same values of supply voltage. If it is desired that the same amplitude per step be obtained in the present invention compared to conventional counters, I am able to provide a considerably greater number of steps or risers while using the same values of supply voltage.

In one embodiment of the invention successfully tried out in practice, the counter circuit was able to count by 100 in stable manner using a 300 volt anode supply. Each of the tubes V1 and V2 was a 6SN7 type RCA vacuum tube. Condenser 6 was 150 μμf. Pulse transformer 4 was a Western Electric type 145EWP. Condenser 2 was .01μf. Resistor 5 was one megohm.

The term "ground" used in this description and in the appended claims is not limited to an actual earth connection, but is deemed to include any fixed reference point or point of zero alternating current potential.

What is claimed is:

1. The method of operating a counter circuit having a charge collecting condenser and a source of polarizing potential, which comprises charging said condenser at the end of each counting cycle to a negative value at least equal to but opposite in sign to the potential supplied by said source, causing the charge on said condenser to decrease toward but never reach zero by increments in response to correspondingly appearing waves to be counted, and charging said condenser at the end of each cycle of counting to the same negative value before the charge on said condenser reaches zero.

2. The method of operating a counter circuit having a charge collecting condenser, first and second normally non-conducting space paths coupled to said condenser and a source of anode potentials for said space paths, which comprises suddenly developing a relatively high amount of negative charge at least equal to the value of said source on said condenser through said second space path at the end of each counting cycle, applying recurring waves to be counted to said first space path in such sense and magnitude as to cause said first space path to conduct for a time interval not exceeding the duration of the peaks of said waves, removing a negative charge from said condenser through said first space path each time said first space path conducts until the charge on said condenser reaches a critical value below zero and then repeating said steps for another cycle of operations.

3. A counter or frequency divider circuit comprising first and second vacuum tubes normally biased to be non-conducting and each having a grid, an anode and a cathode, means for applying the waves to be counted between the grid and cathode of said first tube, a charge collecting condenser having one plate connected to the cathode of said first tube and its other plate to a point of reference potential, a variable resistor in the anode circuit of said first tube, a three-winding transformer having a first winding connected between said one plate of the condenser and the grid of said second tube, a second winding in the anode circuit of said second tube, and a third winding for deriving the output wave from said transformer, said first and second windings having a step-up ratio therebetween, said windings being so poled that an increase in anode current in said second tube results in an increase in grid voltage on said second tube, a direct connection from the cathode of said second tube to said point of reference potential, and a source of anode polarizing potential connected to said variable resistor and the second winding of said transformer.

4. A counter or frequency divider circuit comprising a first vacuum tube having a grid, a cathode and an anode, a charge collecting condenser connected between said cathode and a point of reference potential, means for applying the waves to be counted between the grid and cathode of said tube, an impedance capable of passing direct current connecting said anode to the positive terminal of a source of unidirectional potential, a grid-leak and condenser coupled to said tube and having such values as to normally bias said tube to cut-off in the absence of applied waves, a second vacuum tube normally biased to cut-off and having a grid, an anode and a cathode, connections from the grid and cathode of said second tube to opposite sides of said charge collecting condenser, and a connection from the anode of said second tube to said positive terminal, said grid and anode connections including windings of a transformer so constructed and arranged that there is a step-up ratio between said windings and an increase in anode current results in an increase in grid voltage, whereby the incremental changes in charge stored in said condenser in response to the applied waves causes said second tube to conduct when the total change in charge on said charge collecting condenser reaches a predetermined value.

5. A counter of frequency divider circuit comprising a first vacuum tube having a grid, a cathode and an anode, a charge collecting condenser connected between said cathode and a point of reference potential, means for applying the waves to be counted between the grid and cathode of said tube, an impedance capable of passing direct current connecting said anode to the positive terminal of a source of unidirectional potential, elements coupled to said tube for normally biasing said tube to cut-off in the absence of applied waves, a one-shot oscillator vacuum tube normally biased to cut-off and having a grid, a cathode and an anode, a regenerative circuit for said one-shot oscillator comprising a pair of coupled coils, said coils having a step-up ratio therebetween, a connection from a point on one of said coils to the grid of said one-shot oscillator, a connection from another point on said one coil to one plate of said charge collecting condenser, a connection from the cathode of said one-shot oscillator to the other plate of said condenser, a connection from a point on the other coil of said pair to the anode of said one-shot oscillator, and a connection from another point on said other coil to said positive terminal, whereby said one-shot oscillator conducts to charge said condenser to a negative value whenever the charge on said condenser reaches a predetermined value in response to the application to said first tube of the waves to be counted.

6. A counter or frequency divider circuit comprising first and second vacuum tubes normally biased to be non-conducting and each having a grid, an anode and a cathode, means for applying the waves to be counted between the grid and cathode of said first tube, a charge collecting condenser having one plate connected to the cathode of said first tube and its other plate to a point of reference potential, a variable resistor in the anode circuit of said first tube, a three-winding transformer having a first winding connected between said one plate of the condenser and the grid of said second tube, a second winding in the anode circuit of said second tube, and a third winding for deriving the output wave from said transformer, a direct connection from the cathode of said second tube to said point of reference potential, and a source of anode polarizing potential connected to said variable resistor and the second winding of said transformer.

7. A counter or frequency divider circuit comprising a first vacuum tube having a grid, a cathode and an anode, a charge collecting condenser connected between said cathode and a point of reference potential, means for applying the waves to be counted between the grid and cathode of said tube, an impedance capable of passing direct current connecting said anode to the positive terminal of a source of unidirectional potential, a grid-leak and condenser coupled to said tube and having such values as to normally bias said tube to cut-off in the absence of applied waves, a second vacuum tube normally biased to cut-off and having a grid, an anode and a cathode, connections from the grid and cathode of said second tube to opposite sides of said charge collecting condenser, and a connection from the anode of said second tube to said positive terminal, said grid and anode connections of said second tube including windings of a transformer so constructed and arranged that an increase in anode current results in an increase in grid voltage, whereby the incremental changes in charge stored on said condenser in response to the applied waves causes said second tube to conduct when the total change in charge on said charge collecting condenser reaches a predetermined value.

8. A counter of frequency divider circuit comprising a first vacuum tube having a grid, a cathode and an anode, a charge collecting condenser connected between said cathode and a point of reference potential, means for applying the waves to be counted between the grid and cathode of said tube, an impedance capable of passing direct current connecting said anode to the positive terminal of a source of unidirectional potential, elements coupled to said tube for normally biasing said tube to cut-off in the absence of applied waves, a one-shot oscillator vacuum tube normally biased to cut-off and having a grid, a cathode and an anode, a regenerative circuit for said one-shot oscillator comprising a pair of coupled coils, a connection from a point on one of said coils to the grid of said one-shot oscillator, a connection from another point on said one coil to one plate of said charge collecting condenser, a connection from the cathode of said one-shot oscillator to the other plate of said condenser, a connection from a point on the other coil of said pair to the anode of said one-shot oscillator, and a connection from another point on said other coil to said positive terminal, whereby said one-shot oscillator conducts to charge said condenser to a negative valve whenever the charge on said condenser reaches a predetermined value less than zero in response to the application of the waves to be counted by said first tube.

WILLIAM D. HOUGHTON.

References Cited in the file of this patent

UNITED STATES PATENTS

| Number | Name | Date |
| --- | --- | --- |
| 2,078,792 | Fitzgerald | Apr. 27, 1937 |
| 2,221,452 | Lewis | Nov. 12, 1940 |
| 2,275,460 | Page | Mar. 10, 1942 |